E. R. Ferry.
Check & Driving-Rein.
Nº 72831. Patented Dec. 31, 1867.
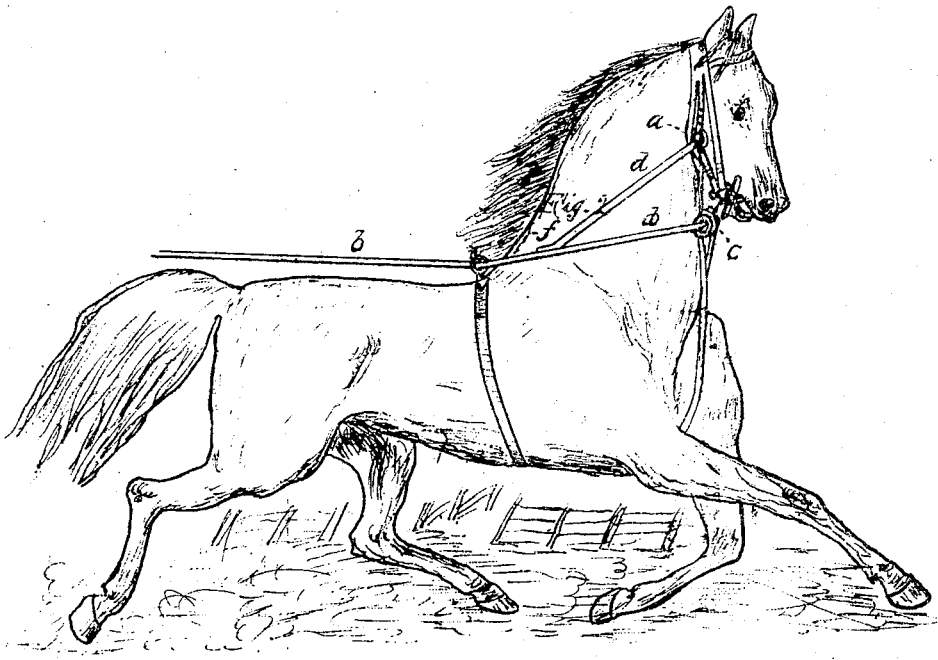
Witnesses.
Inventor:
E. R. Ferry
By his Attorney.

United States Patent Office.

E. R. FERRY, OF NEW HAVEN, CONNECTICUT.

Letters Patent No. 72,831, dated December 31, 1867.

IMPROVED CHECK AND DRIVING-REIN.

*The Schedule referred to in these Letters Patent and making part of the same.*

TO ALL WHOM IT MAY CONCERN:

Be it known that I, E. R. FERRY, of New Haven, in the county of New Haven, and State of Connecticut, have invented a new Combined Check and Driving-Rein; and I do hereby declare the following, when taken in connection with the accompanying drawings, and the letters of reference marked thereon, to be a full, clear, and exact description of the same, and which said drawing constitutes part of this specification, and represents a side view of a horse, showing the arrangement and combination of the reins.

This invention is designed to so combine the check and driving-rein that the head of the horse may be under the most perfect control of the driver, and yet free from that fixed, hard, unnatural position caused by the common arrangement of the check-rein, and consists in the attachment of both the check and driving-rein to the bit, in the usual manner, and uniting the two at a short distance back from the head of the horse, or between the head of the saddle, so that the rein passes through the eye on the saddle in the usual manner.

In order to the clear understanding of my invention, as well as to enable others to construct the same, I will proceed to a description thereof, as illustrated in the accompanying drawing.

The bridle for the head is constructed in the usual manner, with the check-rein eyes $a$ also arranged in the usual manner; $b$, the driving-rein, is passed through the martingale-ring $c$, and attached to the bit, in the usual manner; the check-rein $d$ is also attached to the bit in the usual manner, passed up through the eye $a$, then down and attached to the rein $b$ at $f$. The rein $b$ extends back through the eyes $h$ upon the saddle to the hand of the driver. The check-rein $d$ should be made adjustable on the rein $b$, or at the bit, so as to be lengthened or shortened, if required. Thus constructed and arranged, the horse's head may, by the slackening of the rein $b$, be left perfectly free to be moved up and down, or as the comfort of the horse may require, and when drawn up, as shown in the drawing, the head may be drawn down or up or in to the neck, according as the two reins $d$ and $b$ are adjusted relative to each other, and the head of the horse under most perfect control of the driver, and yet possessing this advantage over all other arrangements, that, while under such perfect control, there is no discomfort to the horse, and at any time, as in ascending a hill, or for watering or for other purposes, by simply slackening the rein, the head of the horse is perfectly free. To draw the horse's head down, the martingale should be adjusted accordingly.

I do not broadly claim the union of the check and driving-rein, as I am aware that such has before been in use.

Having thus fully described my invention, what I claim as new and useful, and desire to secure by Letters Patent, is—

The combination of the check-rein $d$ and driving-rein $b$ with the bit of the bridle, when the said check-rein passes through the eyes $a$, thence directly to the bit, and the whole constructed and arranged so as to operate in the manner described.

E. R. FERRY.

Witnesses:
JOHN H. SHUMWAY,
A. J. TIBBITS.